United States Patent [19]

Davis

[11] Patent Number: 4,883,943

[45] Date of Patent: Nov. 28, 1989

[54] ELECTRIC HEATER FOR FUEL TANK DISCHARGE OPENING COUPLING TO PREVENT FUEL WAXING

[75] Inventor: Leland L. Davis, Saline, Mich.

[73] Assignee: Davco Manufacturing Corporation, Slaine, Mich.

[21] Appl. No.: 133,801

[22] Filed: Dec. 16, 1987

[51] Int. Cl.⁴ .................. H05B 3/82; F02M 31/12; F24H 1/10; F28D 15/02

[52] U.S. Cl. .................. 219/306; 123/549; 123/557; 137/341; 138/33; 165/104.21; 219/205; 219/297; 219/316; 219/530; 219/540

[58] Field of Search ............... 219/205–208, 219/306, 326, 316, 530, 540; 123/543, 549, 557; 138/33; 165/104.21; 137/341; 431/208

[56] References Cited

U.S. PATENT DOCUMENTS

| | | | |
|---|---|---|---|
| 1,532,189 | 4/1925 | Lamont | 219/306 X |
| 2,474,987 | 7/1949 | Runbaken | 219/208 |
| 2,565,993 | 8/1951 | Schmid et al. | 138/33 X |
| 2,669,299 | 2/1954 | Roach | 137/341 |
| 2,769,077 | 10/1956 | Calkins | 219/208 |
| 2,802,520 | 8/1957 | Trabilgy | 137/341 X |
| 2,835,480 | 5/1958 | Perez | 165/104.21 |
| 3,854,454 | 12/1974 | Lazaridis | 219/326 X |
| 3,949,565 | 4/1976 | Roop | 219/326 X |
| 4,105,895 | 8/1978 | Kennedy | 219/326 |
| 4,110,602 | 8/1978 | McDade | 219/306 X |
| 4,131,785 | 12/1978 | Shutt | 219/326 |
| 4,372,279 | 2/1983 | Parks | 219/205 X |
| 4,534,408 | 8/1985 | Thibonnet | 123/557 X |
| 4,684,786 | 8/1987 | Mann et al. | 123/557 X |
| 4,748,960 | 6/1988 | Wolf | 123/557 X |

FOREIGN PATENT DOCUMENTS 3600017 7/1987 Fed. Rep. of Germany ...... 219/205

*Primary Examiner*—Anthony Bartis
*Attorney, Agent, or Firm*—Harness, Dickey & Pierce

[57] ABSTRACT

A coupling for connecting a fuel delivery conduit to the discharge opening of a diesel fuel tank includes a hollow fitting body defining a flow passage in which is located an electric heating rod for heating the fuel as it flow through the passage from the tank to the conduit to prevent waxing of the fuel at low temperatures. A passive heat transfer member, which may be a solid metal rod or an elongated cylindrical heat pipe, is thermally and mechanically coupled at one end to the heating rod and is of sufficient length and is so arranged that its other end extends into the tank through the discharge opening for directing a portion of the heat to the fuel near the discharge opening. On tanks provided with an internal draw tube communicating with the discharge opening, the heat transfer member is designed to extend through the draw tube into the tank and the heat transfer member may be provided with a sleeve of thermal insulation over a portion of the length of the member to focus heat transfer therefrom to the other end thereof.

22 Claims, 4 Drawing Sheets

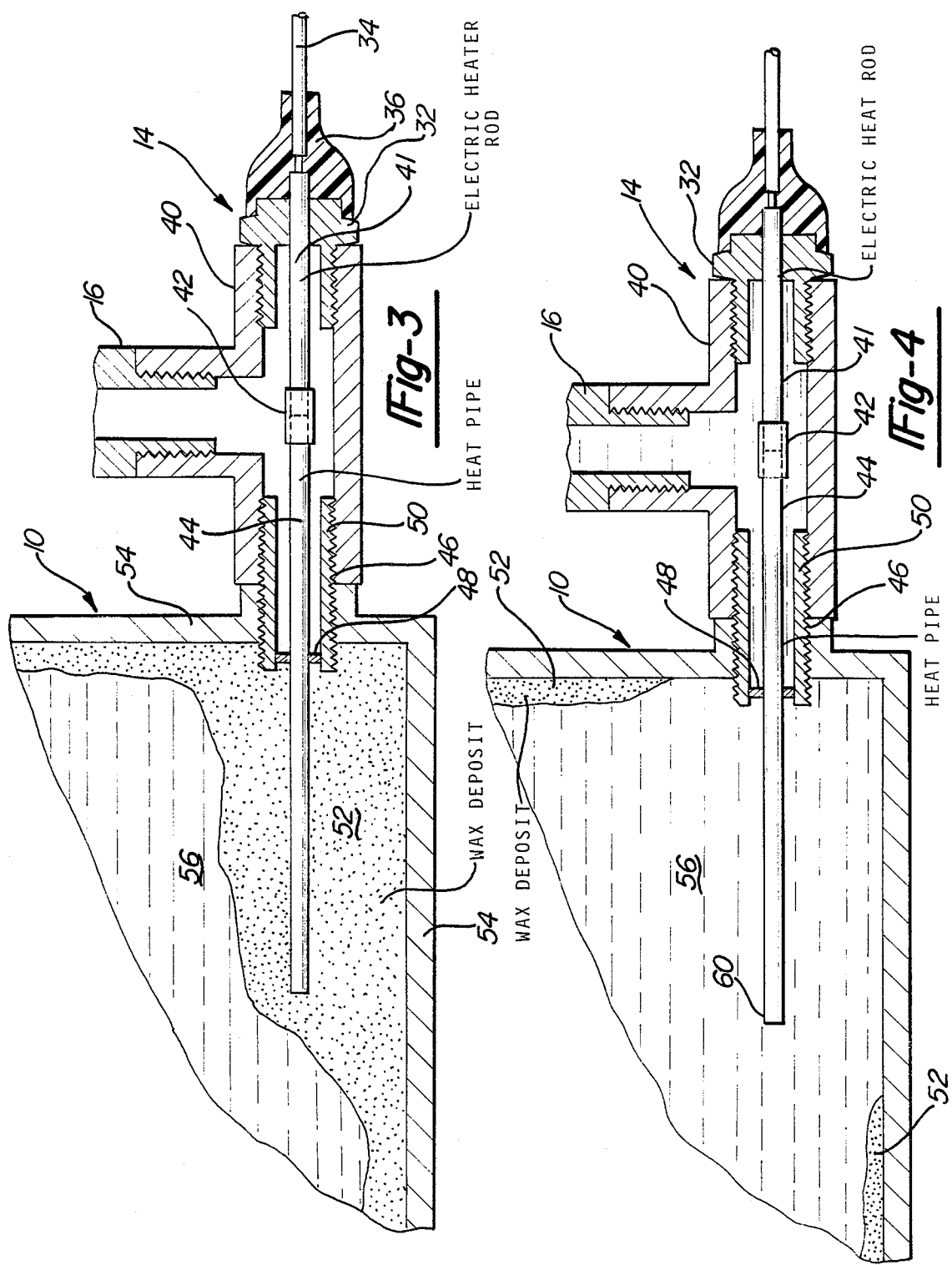

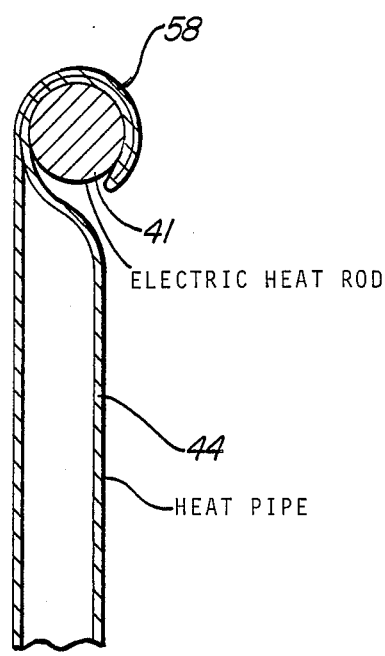
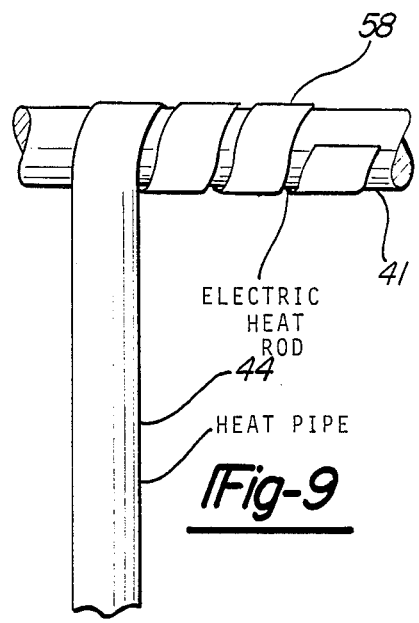
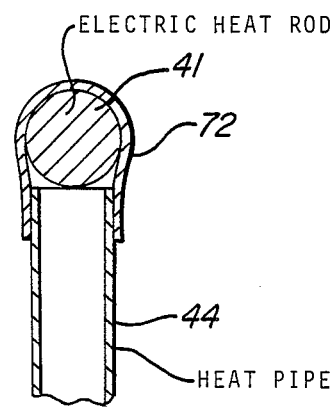
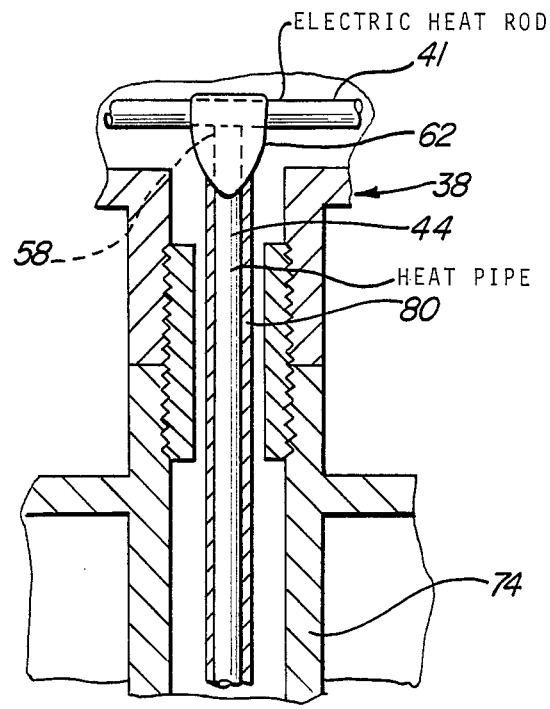
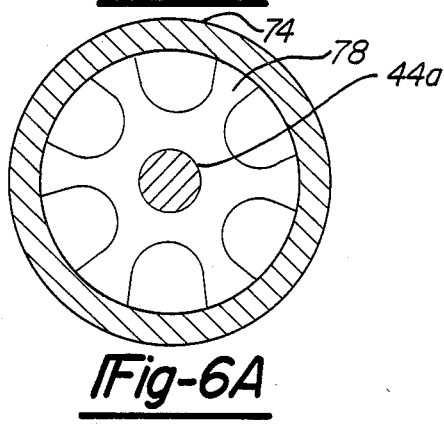
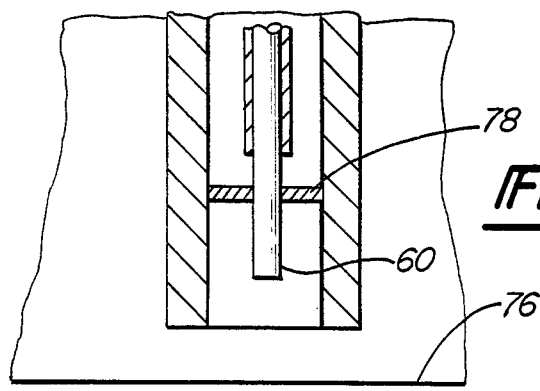

ELECTRIC HEATER FOR FUEL TANK DISCHARGE OPENING COUPLING TO PREVENT FUEL WAXING

BACKGROUND AND SUMMARY OF THE INVENTION

This invention relates generally to fuel system heaters and more particularly to a fuel delivery system having heater elements for heating fuel adjacent to the discharge opening of a fuel tank.

During cold weather it is often necessary to heat liquid fuels prior to introducing the fuel into a combustion device. Certain fuels and particularly diesel fuel oils tend to become more viscous at low temperatures during the winter months. As temperature decreases, typical diesel fuels tend to form wax or wax-like deposits which build up on the inner sides of the fuel tank and also collect on the interior walls of conduits connected to the tanks. If this wax builds up severely, flow to the combustion device is inhibited and often flow out of the tank is restricted or completely stopped by clogging of the fuel lines or tank outlet. In addition to wax accumulations within the tank, wax build-up is often encountered at the fuel discharge fitting where the fuel must make a sharp change in direction. A need therefore arises to provide heat inputs to the fuel system to provide a clear path of transmission of fuel from the storage tank to the associated combustion device.

One solution to inhibiting the formation of wax deposits in a fuel oil storage tank is to provide heating coils within the tank which circulate a hot liquid such as hot water originating from the cooling system of a diesel engine. This approach has the disadvantage that heating occurs only after the engine coolant has reached operating temperature and thus does not provide fuel heating when it is most critically needed, i.e., during start-up. Furthermore, this approach does not satisfactorily address heating requirements at the discharge fitting.

Another means of heating fuel is to provide a resistance heater element immersed into the fuel storage tank for warming the entire tank contents to prevent the formation of wax deposits. During extremely cold weather, however, waxing can still take place near the discharge of the tank and in the discharge fitting, thus clogging the discharge line. More importantly, this approach is extremely inefficient in terms of power input requirements.

The present invention eliminates the necessity for heating the entire fuel tank contents by providing a heater element adjacent or within the tank discharge fitting which ensures that a clear fuel flow path is provided out of the tank. The present invention utilizes a heating element such as a resistance heater positioned centrally within a hollow fuel discharge fitting. The heater according to the present invention can be energized prior to starting the engine to preheat the fuel delivery system or can be continuously energized.

Heat generated by the heater element of this invention is transferred directly to the fuel in the tank by means of convection in accordance with a first embodiment of the invention, or by a passive heat transfer element in thermal contact with the heater in accordance with alternate embodiments of the invention. The passive heat transfer elements extends through the tank discharge opening and into the tank to provide heat inputs at selected points within the tank.

Various types of passive heat transfer elements may be used with an active element in accordance with this invention. When a heat pipe is used as a passive conduction element, heat is transferred to the opposite end of the heat pipe by means of evaporation and condensation of the working fluid circulating within the heat pipe. Alternately, a solid metal rod can be used as a heat conducting passive element. In this way, heat is transferred by the passive element from the resistance heating element to the fuel in and near the discharge opening of the tank thereby providing a free flow passage for fuel from the tank through the interconnecting conduit and to the engine or an intermediate fuel processing device.

The fuel system heaters according to the present invention are generally positioned within the fuel outlet fitting in the lower side wall of the fuel tank at its bottom. Alternatively, a fuel tank with a top discharge fitting and a drawtube extending into the tank to a position near the bottom may be fitted with a heater in accordance with the present invention. In either application, a resistance heating element may be positioned within the fitting and a passive heat transfer element may be used having one end thermally coupled to the resistance heating element and extending down into the drawtube such that the fuel at the bottom of the drawtube is warmed to reduce wax build-up. To ensure that significant heat is transferred to the opposite end of the passive heat transfer element, an insulating sleeve may be provided around the element for a substantial portion of its length extending into the fuel tank thus precisely delivering heat to selected areas.

Devices according to this invention allow the free flow of fuel from the tank without requiring heating of the entire tank contents, thus providing efficient operation while ensuring that free flow of fuel is maintained. This approach minimizes the energy input requirements by focusing applied heat to the area most likely to cause flow problems.

Further objects, features, and advantages of the present invention will become apparent when taken in light of the attached drawings and following detailed description and appended claims.

BRIEF DESCRIPTION OF THE DRAWINGS

FIG. 3 is a partial sections side view and of a fuel delivery system heater according to the present invention prior to energization of the heated fitting;

FIG. 4 is a partial sectional side view of the fuel delivery system heater shown in FIG. 3 after energization of the heated fitting;

FIG. 6A is a view like FIG. 6 with a solid metal rod in place of the heat pipe;

FIG. 7 is a partial sectional view of a heat pipe connection to a resistance heater in accordance with the present invention;

FIG. 8 is a partial sectional view of another coupling method between a heat pipe or thermally conductive rod and a resistance heater in accordance with the present invention;

FIG. 9 is a partial perspective view of another method of coupling the heat pipe to the resistance heater in accordance with the present invention; and FIG. 10 is a partial sectional view of the assembly shown in FIG. 5 including an insulating sleeve over the heat pipe portion of the fuel delivery system heater in accordance with the present invention.

DETAILED DESCRIPTION OF THE INVENTION

Figure 1:
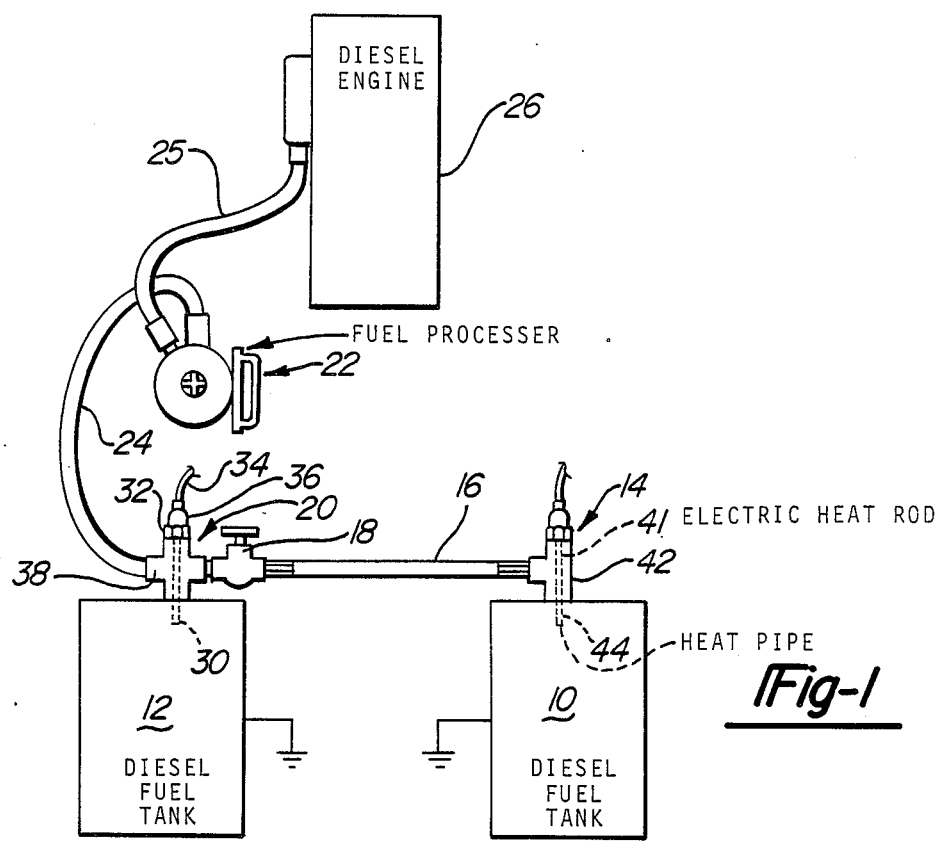
FIG. 1 is a schematic top view of one type of fuel system utilizing fuel delivery system heaters according to the present invention.

Referring now to FIG. 1, the general arrangement of the fuel delivery system utilizing heating elements in accordance with the present invention is shown. FIG. 1 is a top view in which fuel tanks 10 and 12 are shown electrically grounded to the chassis of the vehicle. Extending from the discharge opening in the lower side of tank 10 is T-shaped heated fuel delivery system fitting 14. Fitting 14 is connected via conduit 16 and crossover valve 18 to conduct fuel to heated fuel delivery system fitting 20 which is connected to the discharge opening in the lower side of tank 12. Fitting 20 is connected to fuel processor 22 via conduit 24, and then via conduit 25 to engine 26.

Figure 2:
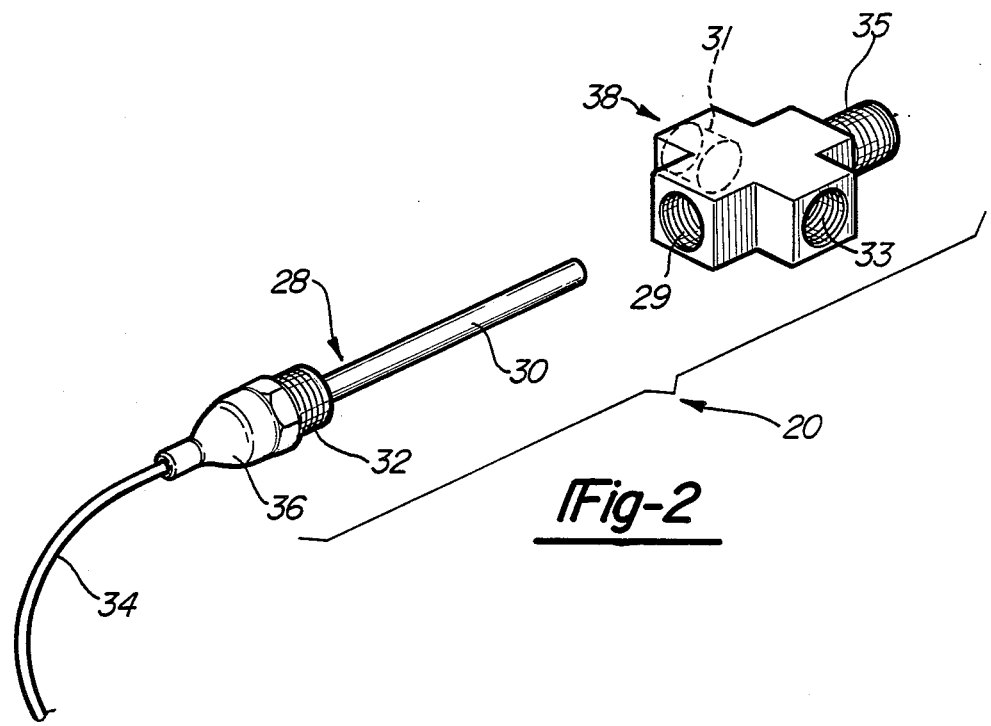
FIG. 2 is an exploded perspective view of the fuel delivery system heater of the present invention.

Fitting 20 is shown in FIG. 2 in an exploded view and generally comprising heater element 28 and fitting housing 38 with female threaded ports 29, 31, and 33, and male threaded pipe end 35. Heater element 28 includes resistance heater rod 30 having one end embedded in pipe plug 32. Resistance heater rod 30 is in turn connected electrically to wire 34 with the connection covered by insulating boot 36. Pipe plug 32 is threaded into fitting housing 38 which is connected to the discharge opening of tank 12 by threaded pipe end 35. When installed, resistance rod extends through fitting 38 and extends out of pipe end 35. Fitting 14 is generally similar in construction to fitting 20 except that fitting housing 40 includes two female threaded ports 37 and 39, rather than three as shown in FIG. 2. Fitting 14 also includes a modified form of heater rod 41 as described below.

The fuel delivery system fitting 14 constructed in accordance with the present invention is shown in FIGS. 3 and 4 connected to fuel tank 10. FIGS. 3 and 4 illustrates how the present invention inhibits the formation of wax within the fuel tank. In these figures, a T-shaped fitting housing 40 is shown. A fitting housing 20 could, however, also be used in this application. As shown in FIG. 3, resistance heater rod 41 is embedded in plug 32 and is electrically connected to wire 34. Heater rod 41 is shorter than heater rod 30 and does not extend out of pipe end 35. The electrical connection for heater rod 41 is covered and protected by insulating boot 36 which precludes moisture entry into the fitting and also insulates the connection to prevent short circuiting of wire 34 to chassis ground.

For this embodiment of the invention, the opposite end of resistance heater rod 41 is connected via a straight sleeve coupling 42 to a passive heat transfer element such as a solid thermally conductive rod or, as shown, a heat pipe 44 which extends through fitting housing 40 and into tank 10 through tank discharge opening 46. A spacer 48 is positioned just inside opening 46 and within pipe end 50. This spacer provides support for heat pipe 44 to prevent vibrations from dislodging the heat pipe from coupling sleeve 42.

In FIG. 3, the heater according to the present invention is shown de-energized. In low ambient temperature conditions, wax layer 52 forms along the walls 54 of tank 10. As shown in FIG. 3, flow of liquid fuel 56 is restricted by the build up of wax 52 around discharge opening 46.

As shown in FIG. 4, after heater rod 41 has been energized for a period of time, the waxing and clouding in the fuel is reduced in the area of the discharge opening 46, allowing free flow of fuel out of tank 10. FIGS. 3 and 4 are also representative of operation of fitting 20 utilizing heater 20 without a passive heat transfer member.

Heat pipe 44 shown in FIG. 3 and 4 is a thin walled tube containing a working fluid which evaporates and condenses in accordance with the temperature it is subjected to along its length. In fitting 14 as shown in FIGS. 3 and 4, the heat pipe 44 is butt connected via coupling sleeve 42 to resistance heater rod 41. As current is passed through heater rod 41, the outside surface of the rod is heated. This heat is coupled by conduction to heat pipe 44 which causes the working fluid inside the heat pipe at the connection end to evaporate. A fluid circulation loop is then set up within heat pipe 44 as the fluid at the end of the heat tube that is immersed in the fuel is at a colder temperature than the fluid at the coupling sleeve end of the heat tube. Consequently, the vapor at end 60 condenses, giving up its latent heat of evaporation to the walls of heat pipe 44 and then, via convection, to the wax and fuel surrounding heat pipe end 60. In this manner, heat is efficiently transferred from resistance heater rod 41 to heat pipe end 60 and therefore heats the fuel within tank 10 in the critical areas in and adjacent to fuel tank discharge opening 46.

Figure 5:
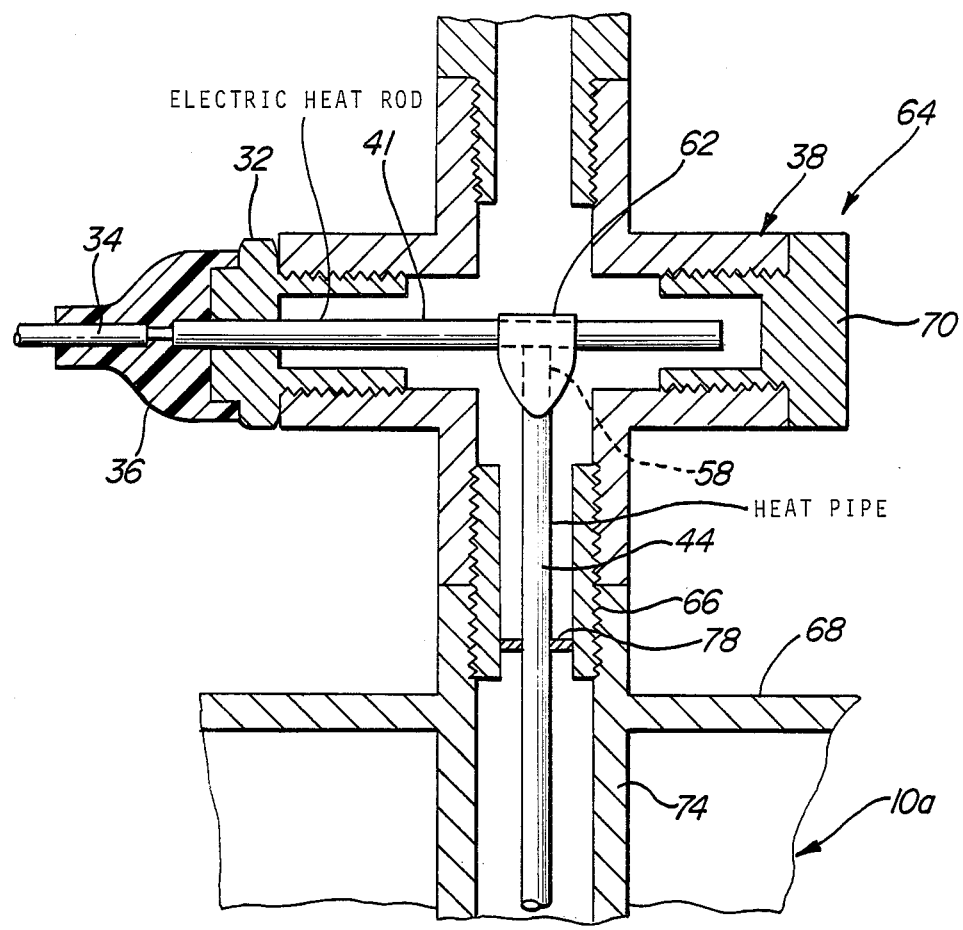
FIG. 5 is a partial sectional view of a fuel delivery system heater according to the present invention installed in a drawtube in the top of a fuel tank.

Several alternative connection schemes by which a thermally conductive rod or heat tube 44 may be connected to resistance heater rod 41 are shown in the drawings. As shown in FIGS. 1 and 5, a fuel delivery fitting incorporating a passive heat transfer element such as heat pipe 44 according to the present invention may also be implemented in a cross-over fitting 20 having the internal construction generally as shown in FIGS. 3 and 4.

The fuel delivery system heater according to the present invention may also be used with fuel tanks having top discharge connections utilizing a drawtube. In FIG. 5, fitting 64 is connected to discharge opening 66 in top tank wall 68. As in the previous embodiments, resistance heater rod 41 is embedded into and extends from pipe plug 32, which is in turn threaded into crossover fitting housing 38.

In the embodiment shown in FIG. 5, resistance heater rod 41 does not extend co-linearly with heat pipe 44 through fitting housing 38. Plug cap 70 is threaded into port 31 and heat pipe 44, having ends 58 and 60, is attached at right angles to and butted against resistance heater rod 41. End 58 of heat pipe 44 is butted against the side of resistance heater rod 41 and fixed against the rod by T-sleeve coupling 62.

The coupling of heat pipe 44 to resistance heater rod 41 may be accomplished by several different means, as shown in FIGS. 7, 8 and 9. For example, end 58 of heat pipe 44 may be collapsed and rolled around resistance heater rod 41 as shown in FIG. 7, or alternatively, more of end 58 of heat pipe 44 may be rolled so as to wrap around resistance heater rod 41 for several turns as shown in FIG. 9. FIG. 8 shows strap 72 which is positioned over resistance heater rod 41 and soldered at each end to heat pipe 44 or to a thermally conductive rod as discussed above. Alternatively, a T-sleeve spring metal clip coupling 62 as shown in FIGS. 5 and 10 may be utilized. T-sleeve coupling 62 is a spring metal clip which is biased into firm contact with end 58 of heat pipe 44.

Figure 6:
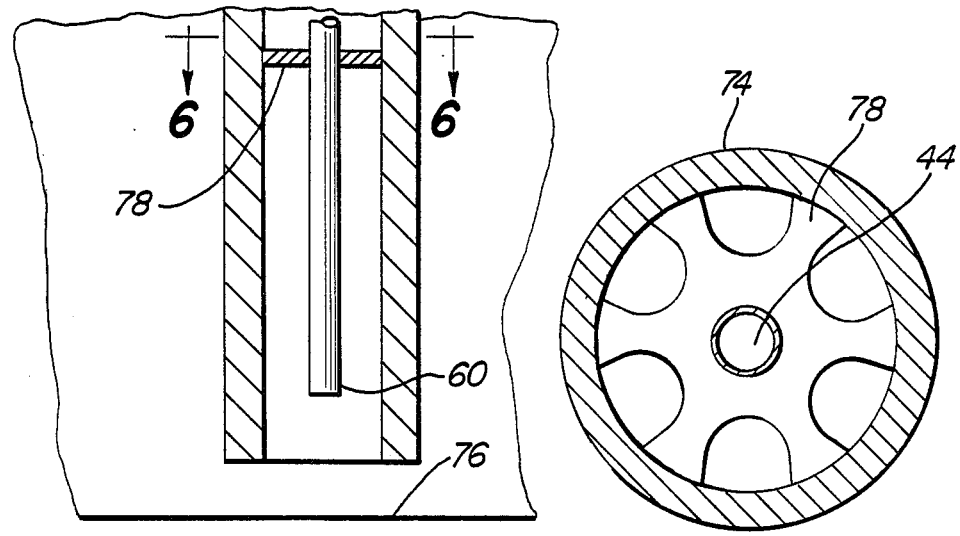
FIG. 6 is a sectional view taken along the line 6—6 in FIG. 5.

Heat pipe 44 extends from fitting housing 38 down into drawtube 74 to a position just short of the end of drawtube 74 which is adjacent the bottom 76 of tank 10A. As the heat pipe 44 in this embodiment is generally longer than that shown in FIGS. 3 and 4, several spacers 78 may be required to provide support for the heat pipe, while at the same time allowing fuel passage through the drawtube 74 and into fitting 38. Spacer 78 may be of various constructions. One such construction is shown in FIG. 6 wherein the spacer is a generally disc shaped spring metal plate having a generally circular shape to fit into drawtube 74 and six flutes equally spaced around the perimeter of the disc for fuel passage and a central bore through which heat pipe 44 is disposed. FIG. 6A is similar to FIG. 6 with the heat pipe replaced with a solid metal rod 44A.

In some embodiments it may be advantageous to more effectively transfer the heat from end 58 of heat pipe 44 to end 60, thereby directing all of the heat to the bottom of the tank around the opening of drawtube 74 near tank bottom 76. This is accomplished as shown in FIG. 10 by providing an insulation sleeve 80 along the majority of the length of heat pipe 44. This focuses the heat transferred from end 58 of heat pipe 44 to end 60. Similar results are achieved utilizing a thermally conductive rod in place of heat pipe 44 and having an insulating sleeve 80 on the rod.

The fitting 64 shown in FIG. 5 may also be produced similar to that shown in FIGS. 3 and 4 where resistance heater rod 30 is connected by a butt connection coupling sleeve. In this case resistance heater rod 41 would be inserted through the upper opening in cross-over fitting 38 as opposed to the horizontal opening shown in FIG. 5.

The instant invention has been described in an illustrative manner and it is to be understood that the terminology which has been used is intended to be in the nature of words of description rather than of limitation. Obviously many modifications and variations of the present invention are possible in light of the above teachings. It is therefore to be understood that within the scope of the appended claims the invention may be practiced otherwise than as specifically described.

What is claimed is:

1. A heated fuel delivery system coupling adapted for use with a fuel tank having a discharge opening, and wherein a conduit is adapted to be connected to said coupling for directing flow of fuel from the tank through the conduit to a combustion device, said coupling comprising:
    a hollow fitting body having a fuel flow passage therethrough, said body having at least two fuel flow openings communicating with said passage, including a first fuel flow opening adapted to be connected to the discharge opening of a fuel tank and a second fuel flow opening adapted to be connected to the conduit;
    active heating means in said passage acting as a heat source for warming fuel within said passage; and
    a passive heat transfer means in said passage thermally coupled to said active heating means and extending outwardly through said first opening a distance sufficient that when the first opening is connected to the discharge opening of the fuel tank the passive heat transfer means extends into the tank through the discharge opening thereof for heating fuel in the vicinity of the discharge opening thereby reducing fuel waxing.

2. The coupling according to claim 1 wherein said active heating means is an electrical resistance heating rod.

3. The coupling according to claim 2 wherein said passive heat transfer means is a heat pipe filled with a working fluid for transferring heat by evaporation and condensation of said fluid.

4. The coupling according to claim 1 wherein said passive heat transfer means comprises a solid metal rod.

5. The coupling according to claim 1 wherein said active and passive heating means are cylindrical in shape and are butt connected.

6. The coupling according to claim 1 wherein said active heating means and said passive heat transfer means are cylindrical in shape and are oriented generally perpendicular to one another wherein an end of said passive heat transfer means contacts said active heating means along a portion of its length.

7. The coupling according to claim 6 wherein said active heating means and said passive heat transfer means are connected by a metal attaching clip.

8. The coupling according to claim 6 wherein said active heating means and said passive heat transfer means are connected by wrapping an end of said passive heat transfer means around said active heating means.

9. The coupling according to claim 1 wherein said passive heat transfer means is cylindrical in shape and a thermal insulating sleeve surrounds a portion of said passive heat transfer means.

10. A heated fuel delivery system coupling adapted for use with a fuel tank having a discharge opening, and wherein a conduit is adapted to be connected to said coupling for directing flow of fuel from the tank through the conduit to a combustion device, said coupling comprising:
    a hollow fitting body having a fuel flow passage therethrough, said body having at least two fuel flow openings communicating with said passage including a first fuel flow opening adapted to be connected to the discharge opening of the fuel tank and a second fuel flow opening adapted to be connected to the conduit;
    electrical heating means attached to said body and extending into said passage, said heating means including an elongated resistance heating rod;
    an insulated electrical conductor;
    connecting means joining said conductor to said heating rod for directing electrical current to said rod, said rod adapted to warm the fuel within said passage of said fitting body; and
    said heating means further including a passive heat transfer means in said passage thermally connected to said resistance heating rod and extending outwardly of the fitting body through the first opening a sufficient distance that when the first opening of the fitting body is connected to the discharge opening of the fuel tank, the passive heat transfer means extends into the tank through the discharge opening thereof for heating the tank contents in the vicinity of the discharge opening.

11. The coupling according to claim 10 wherein said passive heat transfer means is a heat pipe.

12. The coupling according to claim 11 wherein said heat pipe has a flattened end, said flattened end being wrapped around said rod to secure said heat pipe to said rod and to conduct heat from said rod to said heat pipe.

13. The coupling according to claim 11 wherein said heat pipe further comprises a thermal insulating sleeve surrounding said heat pipe along a major portion of the length of said heat pipe so as to direct heat transferred from said heating rod to the uninsulated portion of said heat pipe for dissipation.

14. The coupling according to claim 11 further including a spring spacer means in said passage and positioned between said fitting body and said heat pipe providing support to said heat pipe.

15. The coupling according to claim 14 wherein said spring spacer means comprises a spring disc having a central bore for passage of said heat pipe therethrough and an outer edge having a plurality of flutes therein for passage of fuel therethrough when said heat pipe with said spacer mounted thereon is positioned within said passage of said fitting body.

16. The coupling according to claim 10 wherein said passive heat transfer means is fastened to said rod by a metal spring clip fixed to an end of said passive heat transfer means.

17. The coupling according to claim 11 wherein the tank with which the coupling is adapted to be used includes a drawtube having two ends, one end attached to said tank adjacent and communicating with said discharge opening, the other end of said drawtube projecting into said tank, and said passive heat transfer means being of a length to extend through the drawtube whereby heat is directed to the fuel at the other end of said drawtube.

18. A heated fuel delivery system coupling adapted for use with a fuel tank having a discharge opening, and wherein a conduit is adapted to be connected to said coupling for directing flow of fuel from said tank through the conduit to a combustion device, said coupling comprising:

a hollow fitting body having a fuel flow passage therethrough, said body having at least two flow openings communicating with said passage including a first fuel flow opening adapted to be connected to said discharge opening of the fuel tank and a second fuel flow opening adapted to be connected to the conduit;

an electrical heating rod acting as a heat source attached to said body and extending into said passage;

a thermally conductive passive heat transfer means thermally coupled to said heating rod within said passage and extending outwardly through said first opening a sufficient distance that when said first opening is connected to the discharge opening of a tank, said heat transfer means extends through the discharge opening into the tank for heating the tank contents in the vicinity of the discharge opening; and connecting means joining said heating rod to said passive heat transfer means for transferring heat to said passive heat transfer means, said passive heat transfer means adapted to direct said thermal energy to the fuel in and adjacent the discharge opening of the tank thereby reducing waxing of the fuel and ensuring free flow of the fuel from the tank through the conduit to the combustion device.

19. The coupling according to claim 18 wherein the passive heat transfer means further comprises a heat pipe having a thin thermally conductive wall and a working fluid for transferring heat by evaporation and condensation from one end of said heat pipe to the other.

20. The coupling according to claim 19 wherein said heat pipe further comprises a thermal insulating sleeve surrounding said heat pipe along the major portion of the length of said heat pipe so as to direct heat transferred from the heating rod to the uninsulated portion of said heat pipe.

21. The coupling according to claim 19 further including spacer means positioned in said passage between said fitting and said heat pipe to provide support for said heat pipe.

22. The coupling according to claim 21 wherein said spacer means comprises a spring disk having a central bore for passage of said heat pipe therethrough and an outer edge having a plurality of flutes therein for passage of fuel therethrough when said heat pipe with said spacer mounted thereon is positioned within said passage of said fitting body.

* * * * *